United States Patent [19]
Kanda

[11] Patent Number: 5,867,611
[45] Date of Patent: *Feb. 2, 1999

[54] DIGITAL COPIER

[75] Inventor: Yoshimichi Kanda, Kawasaki, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 458,824

[22] Filed: Jun. 2, 1995

[30] Foreign Application Priority Data

Jun. 3, 1994 [JP] Japan .................................. 6-122740

[51] Int. Cl.$^6$ .................................................. H04N 1/387
[52] U.S. Cl. .......................... 382/284; 358/450; 358/452; 358/543
[58] Field of Search ..................................... 358/401, 468, 358/448, 447, 450, 296, 444, 451, 406, 443, 529, 530, 537, 538, 452, 453, 504; 382/254, 274, 294, 295, 298, 299, 284; 399/81, 83; H04N 1/04, 1/40

[56] References Cited

U.S. PATENT DOCUMENTS

| 5,124,799 | 6/1992 | Tsuboi et al. | 358/454 |
|---|---|---|---|
| 5,181,127 | 1/1993 | Ogino et al. | 358/443 |
| 5,260,805 | 11/1993 | Barrett | 358/451 |
| 5,305,116 | 4/1994 | Kagami | 358/448 |
| 5,446,476 | 8/1995 | Kouzaki | 358/518 |
| 5,448,346 | 9/1995 | Tabata | 358/449 |
| 5,457,540 | 10/1995 | Kajita | 358/296 |
| 5,465,163 | 11/1995 | Yoshihara et al. | 358/444 |

*Primary Examiner*—Kim Yen Vu
*Attorney, Agent, or Firm*—Oblon, Spivak, McClelland, Maier & Neustadt, P.C.

[57] ABSTRACT

In a digital copier which allow the quality of an output image to be adjusted in a plurality of levels, a scanner reads a document image and generates corresponding image data. An analog-to-digital converter transforms the image data to a pixel-by-pixel electric signal. The electric signal is written to an image memory. An image processing section reads a particular portion of the image (e.g. one-fifth in the sub-scanning direction) out of the memory repeatedly, while changing density each time. The results of such processing are sent to a recording section and printed on a single paper as a combined image. As a result, partial images representative of a particular density each are printed on a single paper. This not only promotes easy evaluation but also saves papers.

30 Claims, 26 Drawing Sheets

★ PLEASE MARK A RANGE

★ RANGE SELECTION IS OK

FIG. 3A
FIG. 3B
FIG. 4A
FIG. 4B
FIG. 4C
FIG. 4D
FIG. 4E

★ PLEASE MARK A RANGE

★ RANGE SELECTION IS OK

Fig. 12
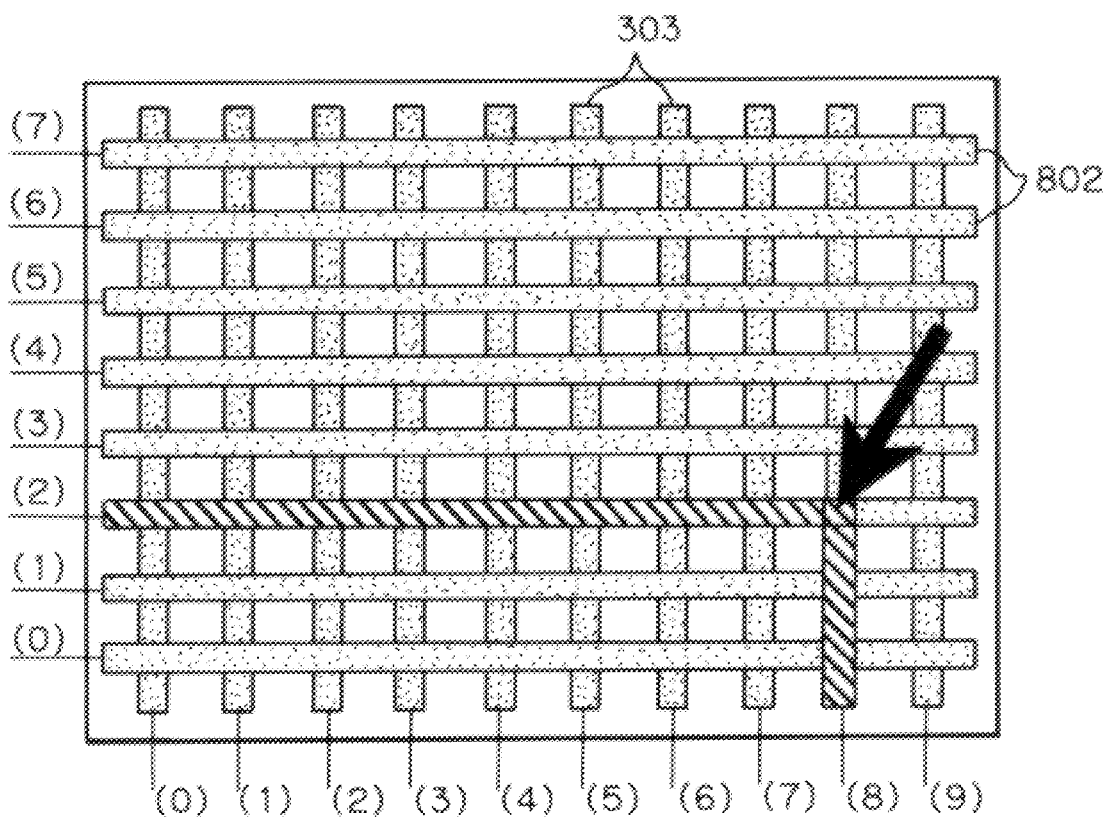
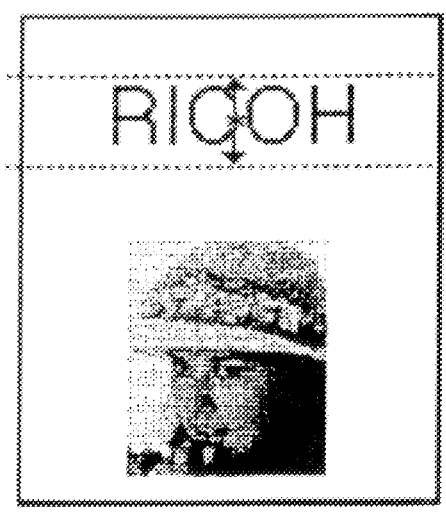
FIG. 13A
FIG. 13B

★PLEASE ENTER THE NUMBER
  OF IMAGES : __

★PLEASE ENTER THE NUMBER
  OF IMAGES : 8

★PLEASE CHOOSE A DENSITY NUMBER : _

★PLEASE CHOOSE A DENSITY NUMBER : 3

★ PLEASE CHOOSE A DENSITY IMAGE

★ IMAGE SELECTION IS OK

★ PLEASE MARK THE TOP OF AN IMAGE RANGE

★ PLEASE MARK THE BOTTOM OF AN IMAGE RANGE

★ COMBINED IMAGE WILL BE OUTPUT ON TWO PAPERS

COMBINED IMAGE × 2

★ PLEASE CHOOSE THE PAGE NUMBER OF A DESIRED IMAGE

★ PLEASE CHOOSE PAPER SIZE.
A4 : 1, A3 : 2

FIG. 30A
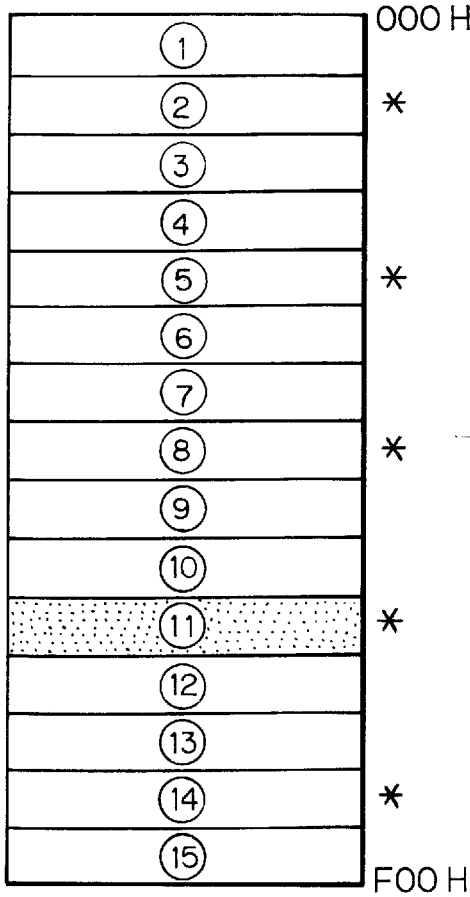
FIG. 30B
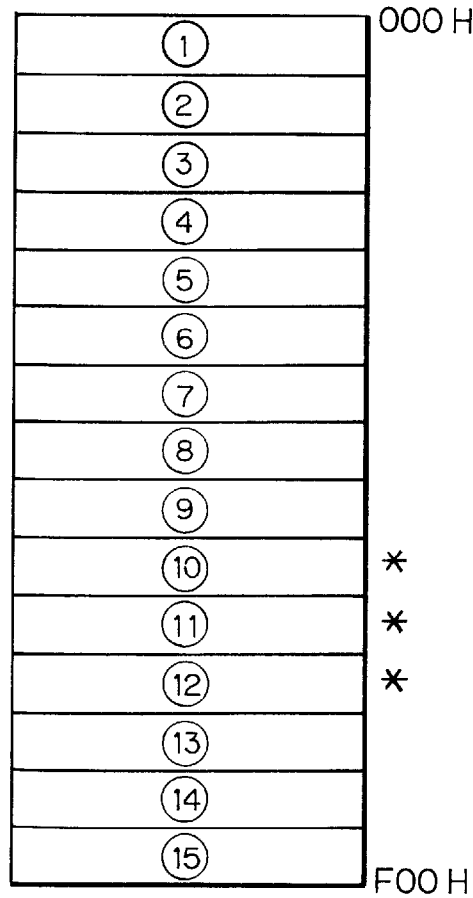
Fig. 31
★ FOR A MORE MINUTE COMBINED IMAGE, PLEASE PRESS COMBINE KEY AND THEN START KEY

FILTER SELECT SIGNAL

| 1 | 2 | 2 | 2 | 1 |
|---|---|---|---|---|
| 2 | 2 | 2 | 2 | 2 |
| 1 | 2 | 2 | 2 | 1 |

× (1/26)

| 1 | 2 | 2 | 2 | 1 |
|---|---|---|---|---|
| 2 | 3 | 3 | 3 | 2 |
| 1 | 2 | 2 | 2 | 1 |

× (1/29)

| 1 | 2 | 2 | 2 | 1 |
|---|---|---|---|---|
| 2 | 4 | 4 | 4 | 2 |
| 1 | 2 | 2 | 2 | 1 |

× (1/32)

| 1 | 2 | 2 | 2 | 1 |
|---|---|---|---|---|
| 2 | 5 | 5 | 5 | 2 |
| 1 | 2 | 2 | 2 | 1 |

× (1/35)

| 1 | 2 | 2 | 2 | 1 |
|---|---|---|---|---|
| 2 | 6 | 6 | 6 | 2 |
| 1 | 2 | 2 | 2 | 1 |

× (1/38)

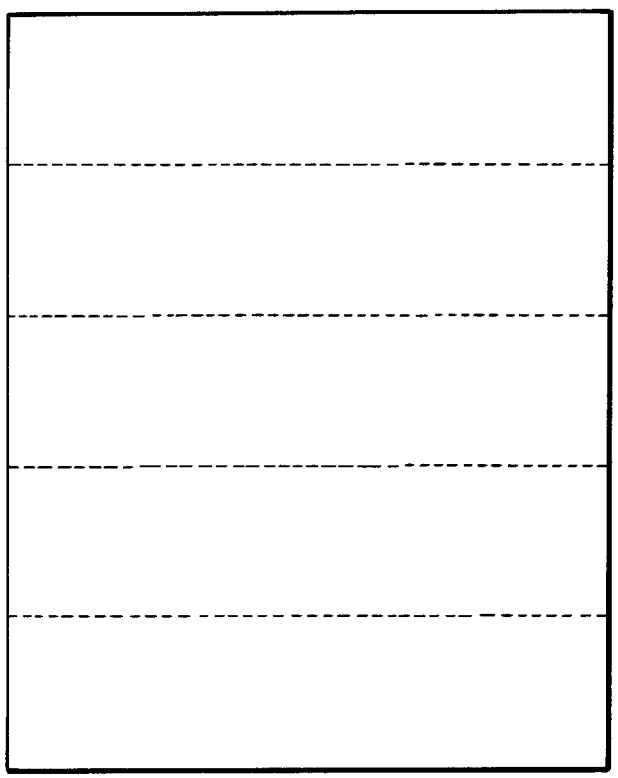

DIGITAL COPIER

BACKGROUND OF THE INVENTION

The present invention relates to a digital copier of the type allowing the quality of an output image to be adjusted in a plurality of levels.

It has been customary with a digital copier of the type described to print an image on a paper for every one of a plurality of characteristics relating to reflectance and density. This kind of scheme is not desirable because the number of times of image output and, therefore, the waiting time increases, and because a number of paper sheets are wasted. In addition, the evaluation of density is not easy because of such a number of output images. Technologies pertaining to the image quality adjustment are disclosed in, for example, Japanese Patent Laid-Open Publication No. 2-54282.

SUMMARY OF THE INVENTION

It is, therefore, an object of the present invention to provide a digital copier capable of enhancing efficient image quality setting and saving papers in the event of image quality adjustment.

A digital copier of the present invention has an image reading section for reading a document image and outputting pixel-by-pixel image data representative of the document image as an electric signal, a storage for storing the image data output form the image reading section, a processing section for reading a particular range of the image data out of the storage repeatedly, while changing the image quality of the image data each time, and a recording section for recording the output signal of the image processing section on a paper as a combined image quality image.

BRIEF DESCRIPTION OF THE DRAWINGS

The above and other objects, features and advantages of the present invention will become more apparent from the following detailed description taken with the accompanying drawings in which:

FIGS. 3(a) and 3(b) show a particular range of an image to be output for one image quality;

FIGS. 4(a)–4(e) show a specific combined image quality image;

FIG. 12 shows a specific conduction state to occur when the document laid on the editor board is marked;

FIGS. 13(a) and 13(b) show a particular range of the image to be combined when the document is marked, as shown in FIG. 11, and then a start key is pressed;

FIG. 30 shows the contents of a gamma table corresponding to FIG. 29;

FIG. 31 shows a specific message for urging the user to determine whether or not to select more minute densities;

FIG. 35(a)–35(e) show a combined image derived from the filters;

DESCRIPTION OF THE PREFERRED EMBODIMENTS

Figure 36:
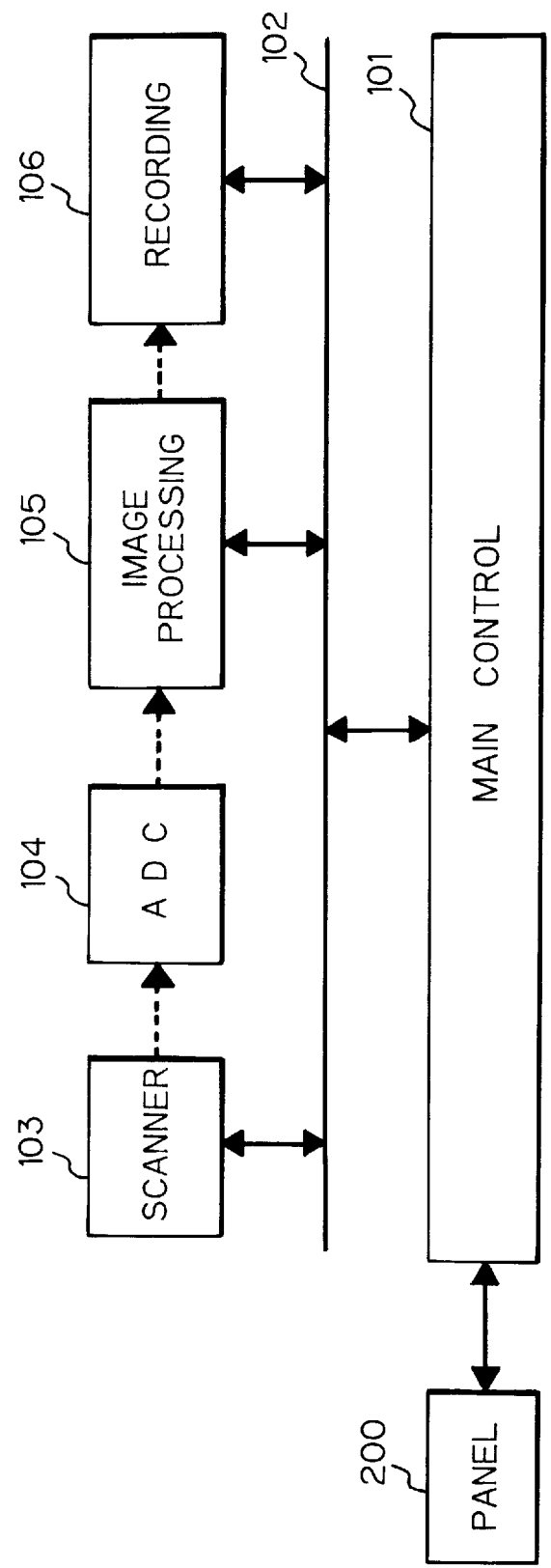
FIG. 36 is a block diagram schematically showing a conventional digital copier.
Figure 37:
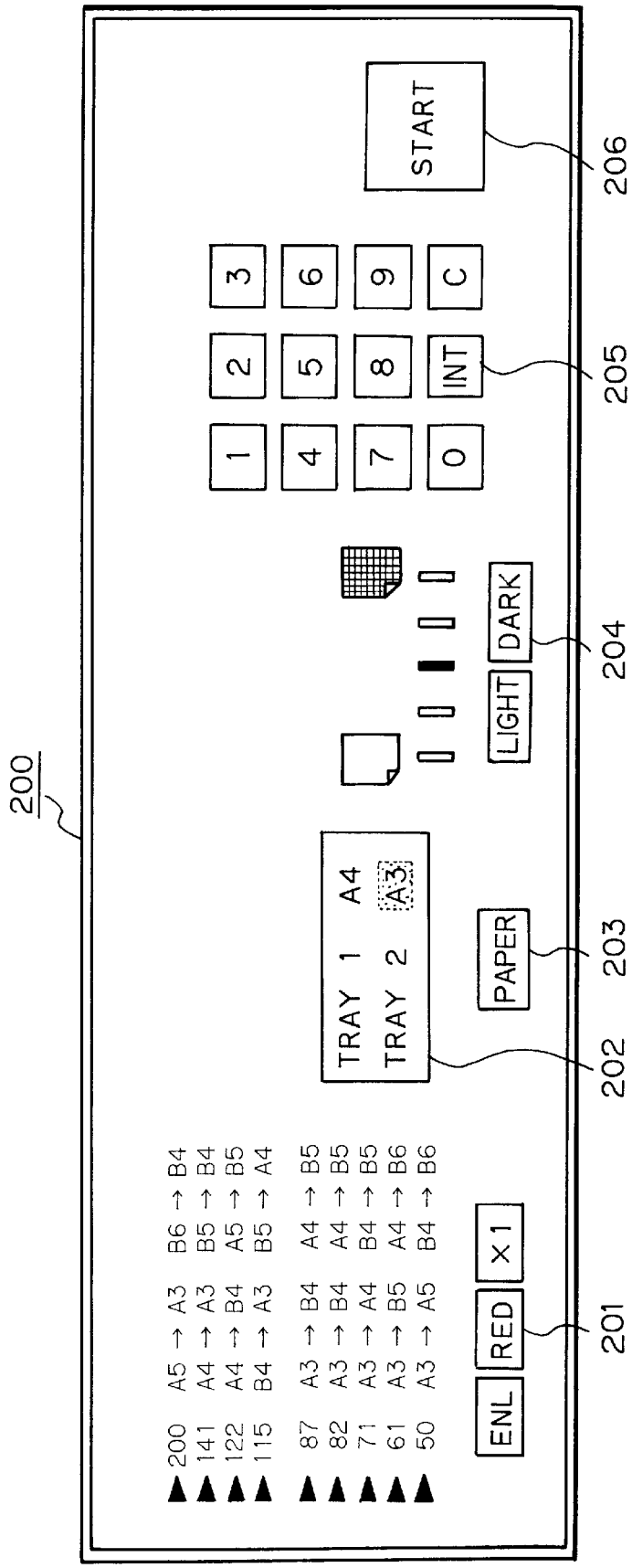
FIG. 37 is a plan view of an operation panel included in the conventional digital copier.

To better understand the present invention, a brief reference will be made to a conventional digital copier, shown in FIG. 36. As shown, the copier has a main control 101. A scanner 103, an analog-to-digital conversion (ADC) 104, an image processing 105 and a recording 106 are connected to the main controller 101 by a bus 102. An operation panel 200 is also connected to the main control 101 and has a specific arrangement shown in FIG. 37. In FIG. 37, there are arranged on the panel 200 magnification change keys 201 (Enl (enlarge), Red (reduce) and x1), a paper size display 202, a paper select key 203, density keys 204 (High and Low), and numeral keys 205. A start key 206 is pressed after desired conditions have been entered on the keys 200–205.

In operation, when the start key 206 is pressed, the main controller 101 starts driving the scanner 103. The scanner 103 reads the image of a document via optics while sending the resulting analog signal to the ADC 104. The ADC 104 converts the analog signal to a digital signal and delivers the digital signal to the image processing 105. The image processing 105 executes various kinds of processing, including filtering and density control, with the digital signal and applies the processed signal to the recording 106. In response, the recording 106 prints an image on a paper.

Figure 38:
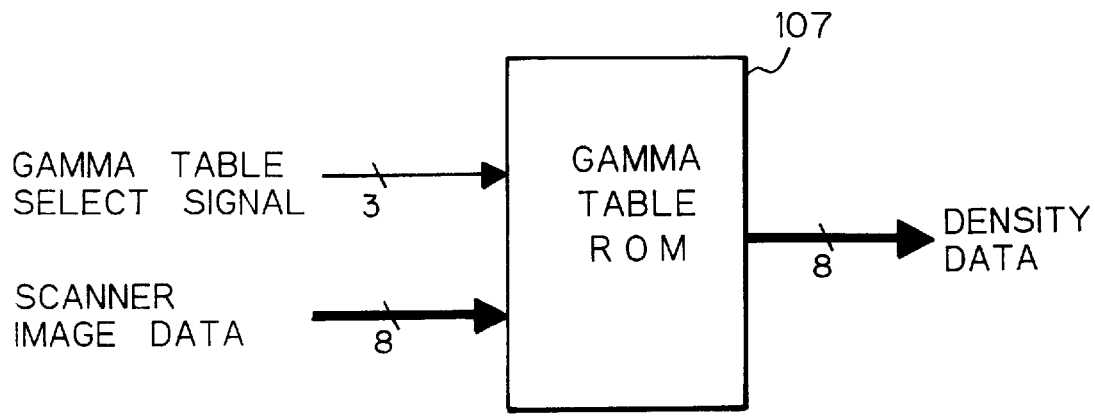
FIG. 38 is a schematic block diagram showing a gamma table ROM (Read Only Memory) included in an image processing section shown in FIG. 36.

A density control method available with the above digital copier is as follows. The density control, which is one of image control functions available with a digital copier, is effected by the image processing 105. FIG. 38 shows a gamma table ROM 107 included in the processing 105. The gamma table ROM 107 stores gamma tables for changing the contrast between the center and the ends of a density width, i.e., for gamma correction. The ROM 107 receives an address having eleven bits, i.e., a gamma table select signal having three bits and scanner image data or reflectance data having eight bits. In response, the ROM 107 outputs density data matching the image data. When the reflectance-linear data is converted to the density-linear data, the data of the ROM 107 are changed. The ROM 107 allocates density data D of 0–255 corresponding to the reflectance data Y.

Figure 39:
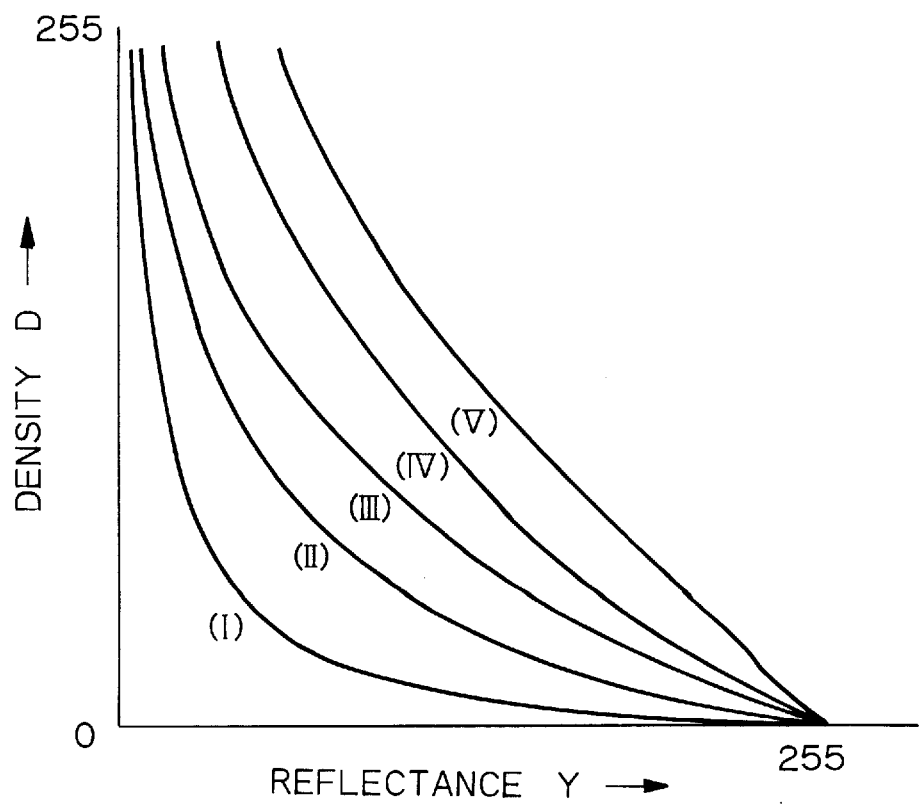
FIG. 39 shows a relation between reflectance Y and density D.
Figure 40A:
FIG. 40(a)–40(f) show a plurality of specific images conventionally output after density control.
Figure 40B:
Figure 40C:
Figure 40D:
Figure 40E:
Figure 40F:
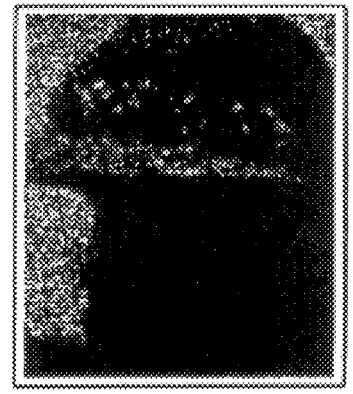

FIG. 39 shows a relation between the reflectance Y and the density D. As shown, five different conversion data (I)–(V) are present. One of the data (I)–(V) can be selected on the density keys 204. The characteristic (I) sets up the lowest image density while the characteristic (11) sets up the highest density. The main control 101 outputs the gamma table select signal on the basis of the information entered on the panel 200. Specifically, by changing the upper bits of the address of the ROM 107, one of five consecutive stages of table data, matching the characteristics (I)–(V), is selected.

The conventional density control described above has some issues yet to be solved, as follows. As shown in FIG. 40, desirable images cannot be output unless five different images associated with the five characteristics, see respective FIGS. 40(b)–40(f) respectively, are printed on respective papers at maximum. An increase in the number of images to be output directly translates into an increase in waiting time and the waste of paper sheets. In addition, such a number of images obstructs the easy evaluation of density.

Preferred embodiments of the digital copier in accordance with the present invention will be described with reference to the accompanying drawings.

1st Embodiment

Figure 1:
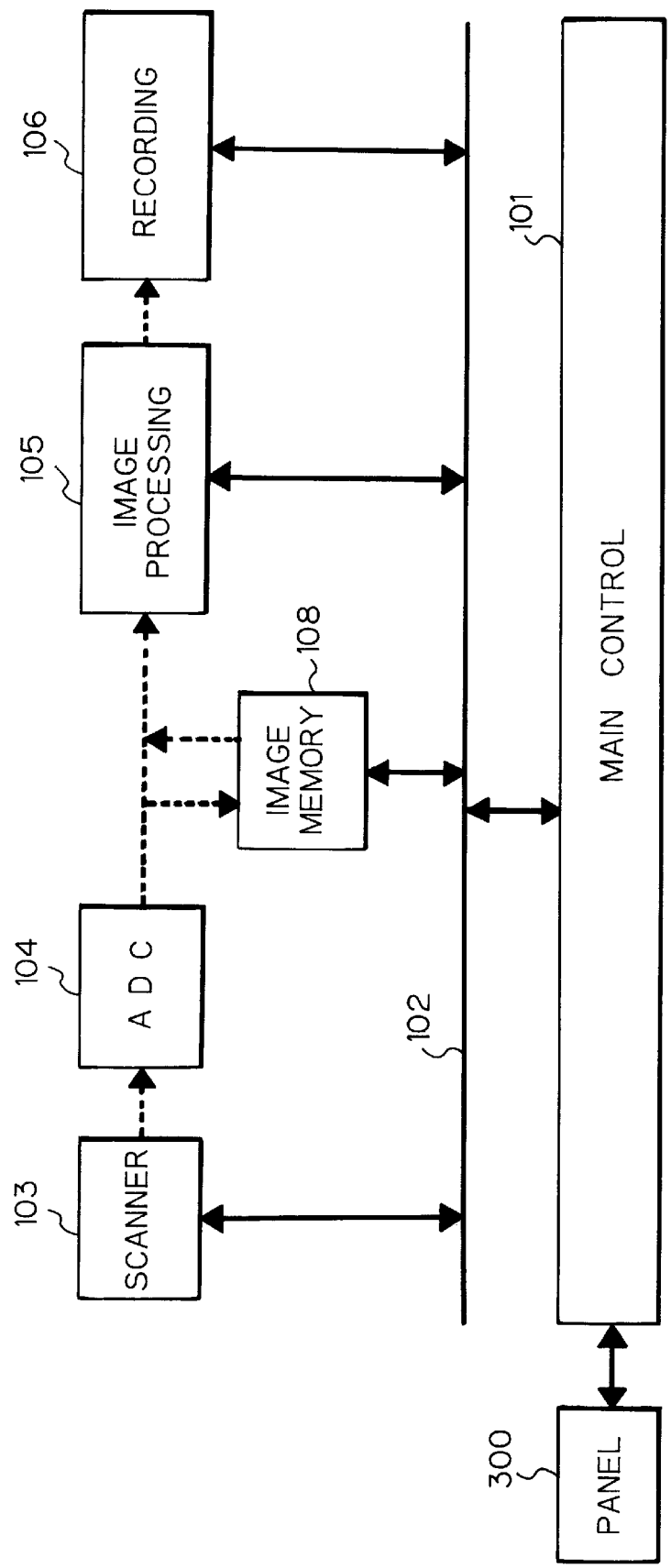
FIG. 1 is a block diagram schematically showing a first embodiment of the digital copier in accordance with the present invention.
Figure 2:
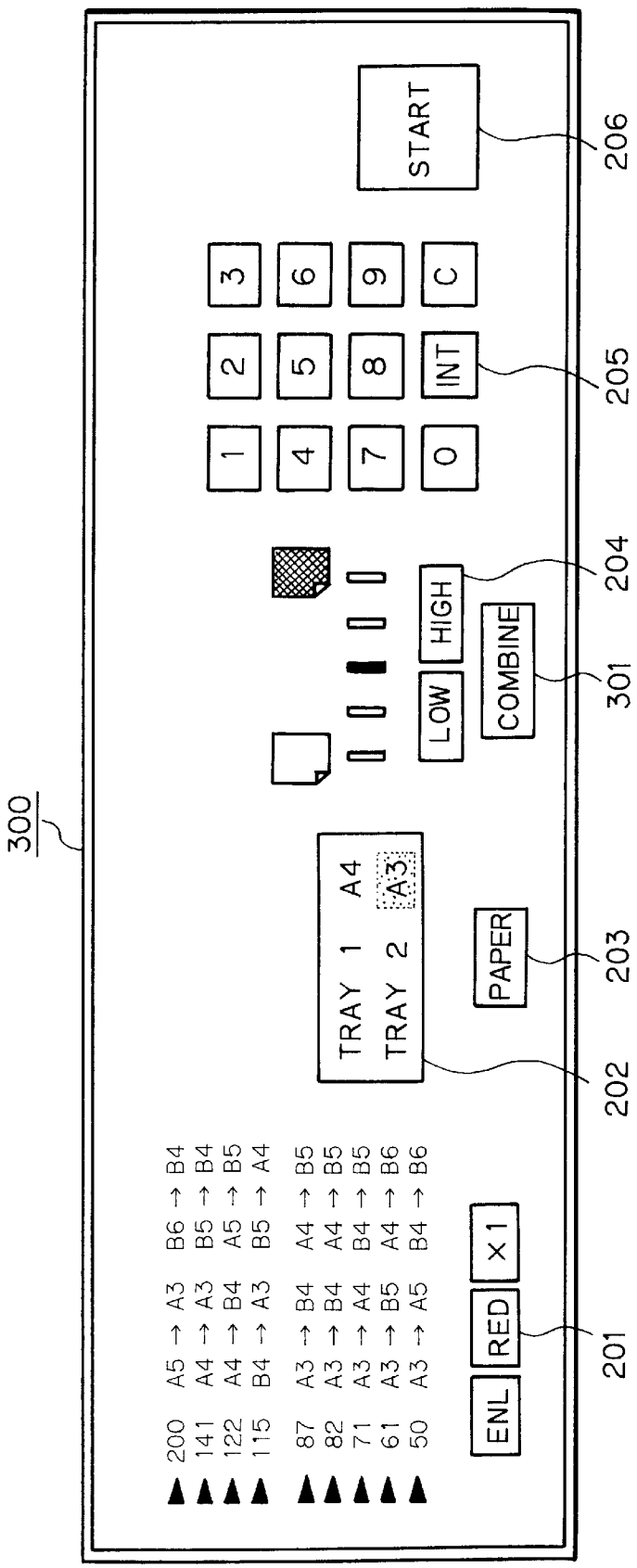
FIG. 2 is a plan view of an operation panel included in the embodiment.

Referring to FIG. 1, a digital copier embodying the present invention is shown. FIG. 2 shows an operation panel included in the embodiment specifically. In FIGS. 1 and 2, the same or similar constituents as or to the constituents shown in FIGS. 36 and 37 are designated by the same reference numerals and will not be described in order to avoid redundancy.

As shown in FIG. 1, the embodiment is characterized in that an image memory 108, or image storing means, is provided between the output of an ADC or image reading means 104 and the output of an image processing 105 and a bus 102. A scanner or image reading means 103 is connected to the input of the ADC 104, as described with reference to FIG. 36. A recording 106 is connected to the output of the image processing 105. A main controller 101 is connected to the above sections by the bus 102. An operation panel 300 is connected to the main control 101. As shown in FIG. 2, the operation panel 200 has, in addition to the various keys shown in FIG. 37, a density combine key 301 adjoining density keys 204 and for entering a density combine command.

In the following description, the words "image quality" refer to the density of an output image. Also, the words "combined density image" refer to a single output image consisting of image portions each having a particular density.

The operation of the panel 300 is identical with the operation of the panel 200, of FIG. 37 except for the following. To produce a combined density image, the user presses the density combine key 301 before the start key 206. In response, a combined density image output mode is set up. When the user presses the start key 206, the main control 101 drives the scanner 103. The scanner 103 reads a document and sends the resulting analog signal to the ADC 104. The ADC 104 transforms the analog signal to a digital signal. When the combined density image output mode is not selected, the digital signal is directly applied to the image processing 105. However, in the above particular mode, the digital signal or image data are once written to the image memory 108.

FIG. 3 shows specific image data 3(a) written to the memory 108. Assume that the image data 3(a) have the previously mentioned characteristic (I) and include a center portion 3(b) covering one-fifth of the entire lines of the image. Then, the addresses of the center portion 3(b) are accessed and output to the image processing 105. In response, the processing 105 selects a gamma table matching the characteristic (I) in the ROM 107 and then outputs a signal in the form of density data. On outputting the last line of the portion 3(b), the memory 108 returns to the first line and accesses the same portion 3(b) again. The processing 105 changes the gamma table select signal, see FIG. 38, input to the gamma table ROM 107 and thereby selects a gamma table matching the characteristic (II). This procedure is repeated five consecutive times. As a result, as shown in FIG. 4, a combined density image showing five stages of density data is output on a single paper. In FIG. 4, portions 4(a)–4(e) respectively correspond to the characteristics 4(a)–4(e) shown in FIG. 39.

2nd Embodiment

In the first embodiment, the center portion of the image is selected because it is often representative of the characteristic of the entire image. However, when it comes to an image of the kind shown in FIG. 5 specifically, a combined density image derived from the center portion of the image is not desirable in determining image quality. Of course, the present invention will be more advantageous if the user can select the portion of an image for producing a combined density image (range setting means). An alternative embodiment to be described has the range setting means.

Figure 6:
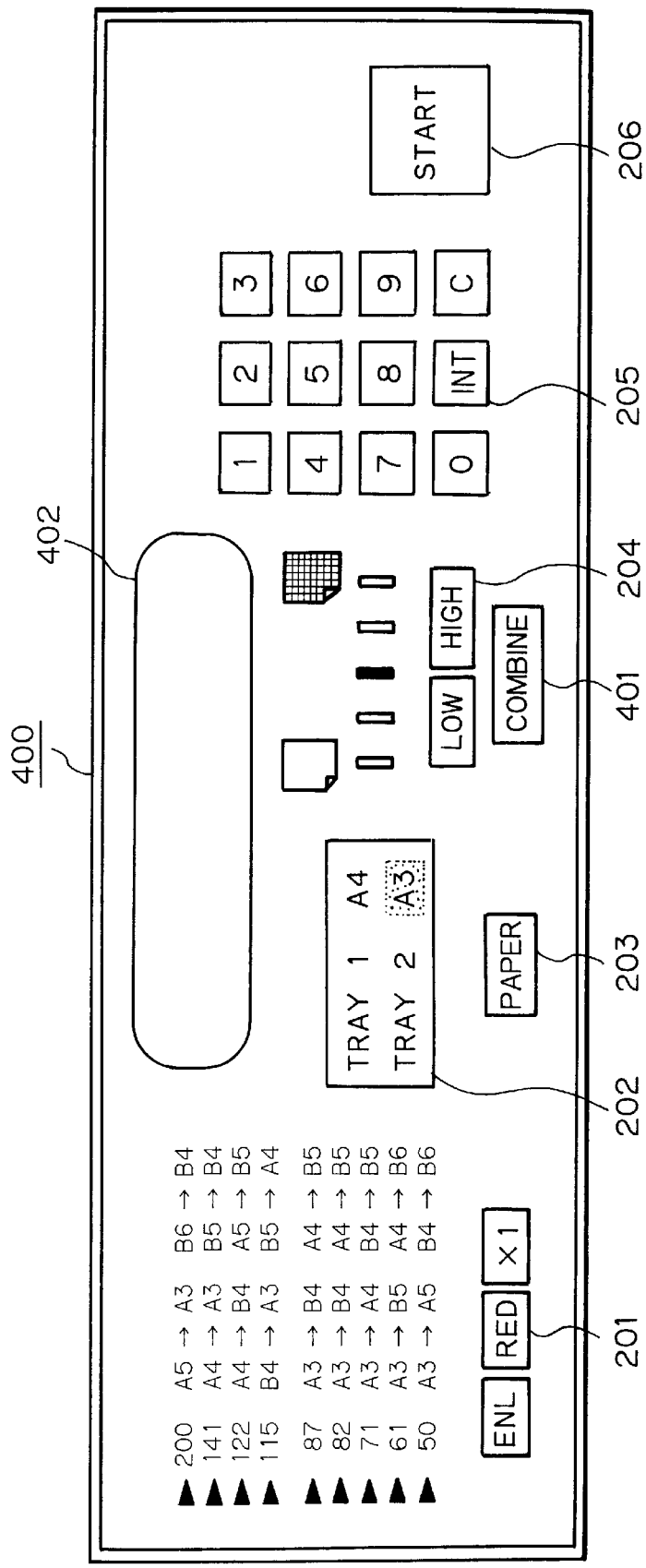
FIG. 6 is a plan view of an operation panel included in a second embodiment of the present invention.

As shown in FIG. 6, an operation panel 400 has a density combine key 401 and a liquid crystal display (LCD) 402 in addition to the keys of the panel 300, of FIG. 2. The combine key 401 is positioned below the density keys 204 while the LCD 402 is positioned above a paper size display 202 and the density keys 204.

Figures 5A, 5B:
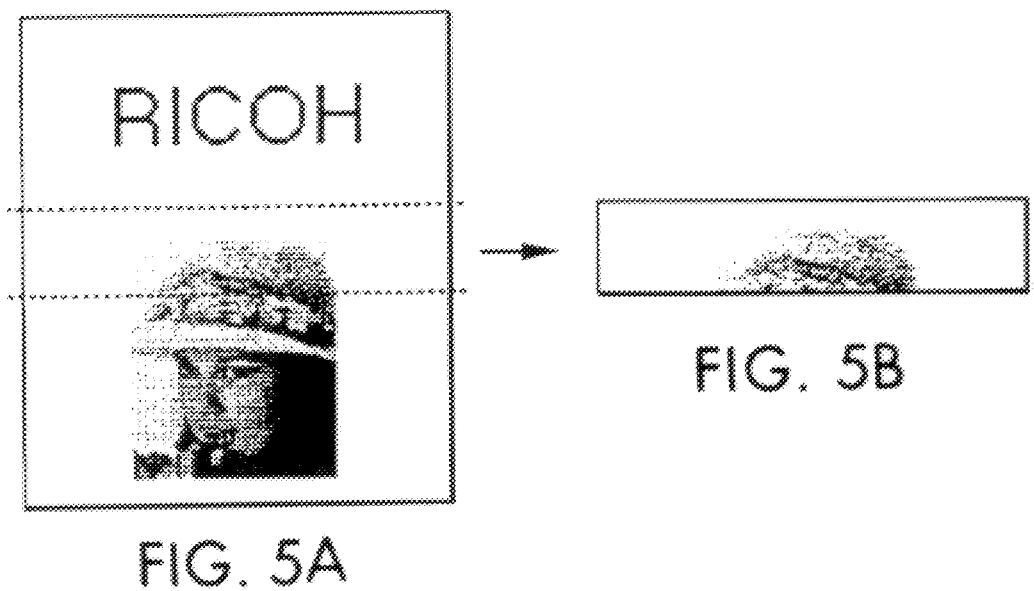
FIGS. 5(a) and 5(b) show a specific case wherein the center portion of the image is not desirable in the event of determining image quality.
Figures 7A, 7B, 8:
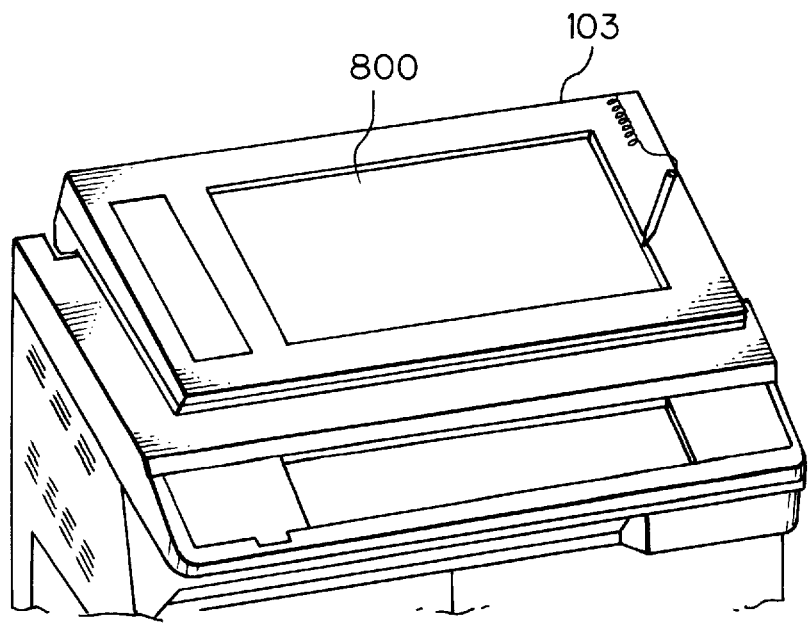
FIGS. 7(a) and 7(b) show specific messages to appear on a liquid crystal display when a density combine key included in the panel of FIG. 6 is pressed.
FIG. 8 is a perspective view of an editor board mounted on a scanner in the second embodiment.

When the user presses the combine key 401, a message for urging the operator to mark the desired range of a document, e.g., "Please mark a range (FIG. 7(a))" appears on the LCD 402. When the user 206 presses the start key 206 while neglecting this message, the center portion of the image is selected, as shown in FIG. 5.

Figure 9:
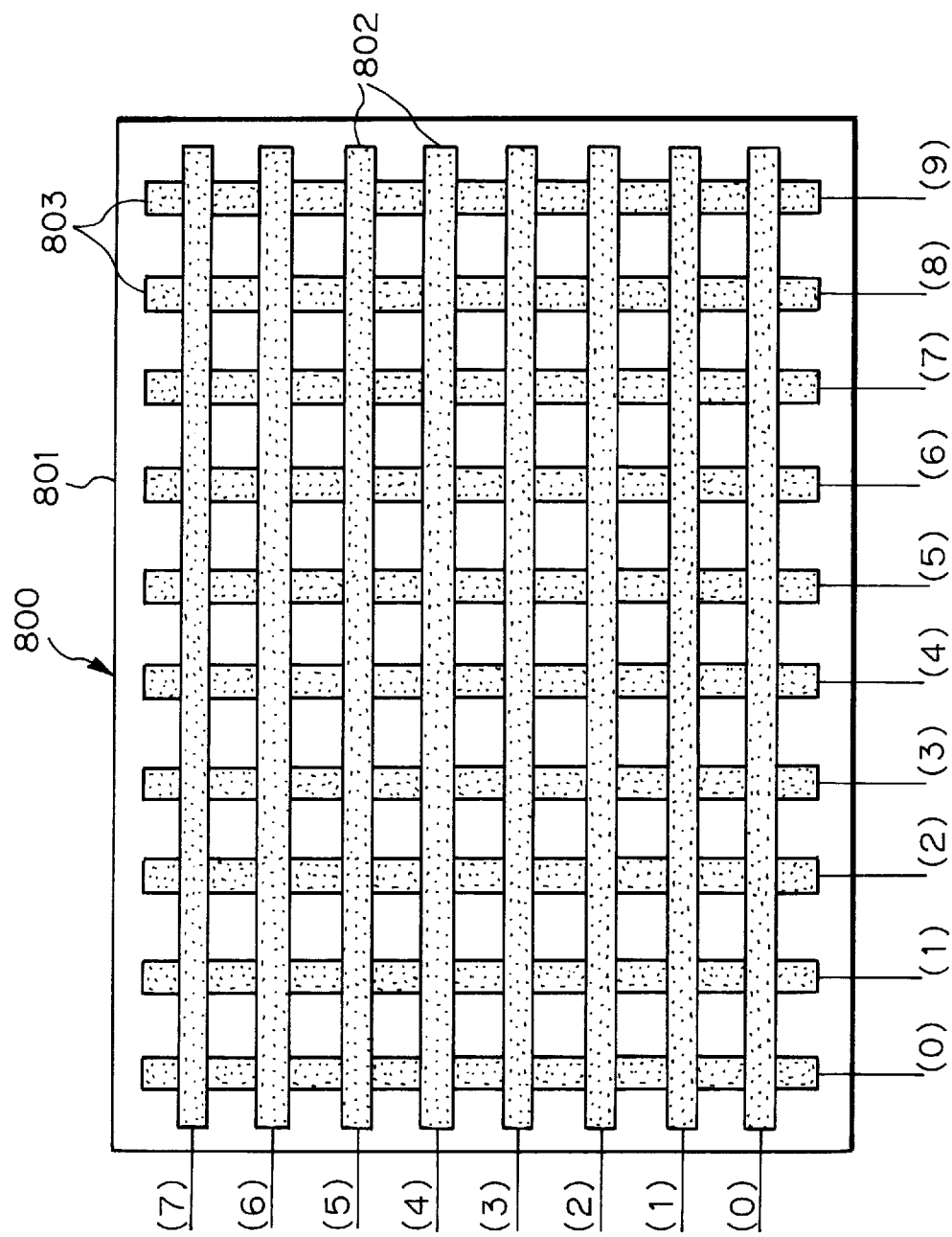
FIG. 9 is a plan view of electrodes arranged in a panel included in the second embodiment.
Figure 10:
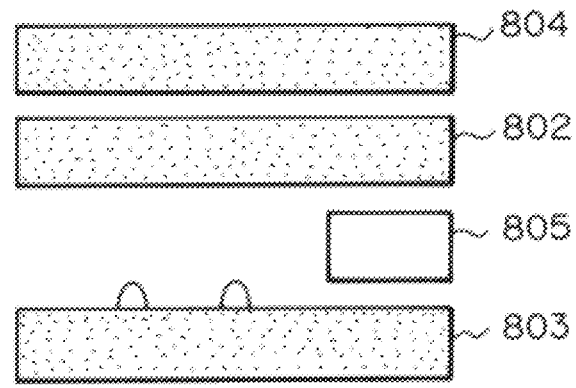
FIG. 10 is a section also showing the electrodes.

As shown in FIG. 8, the embodiment has an editor board 800 on the top of the scanner 103 to allow the user to mark the desired range of an image. As shown in FIG. 9, the editor board 800 has a panel 801 implemented by vertical electrodes and horizontal electrodes arranged at predetermined intervals in a lattice configuration. Specifically, electrodes 802 overly electrodes 803 and extend perpendicularly to the latter. As shown in FIG. 10 in a section, a filter 804 is disposed above the electrodes 802. A spacer 805 is located at a predetermined position below the electrodes 802. The electrodes 803 are located below the spacer 805. When the upper surface of the editor board 800 is pressed at any desired point, the electrodes 802 and 803 underlying the pressed point contact each other. As a result, a current flows between the two electrodes 802 and 803 under the application of a voltage.

Figure 11:
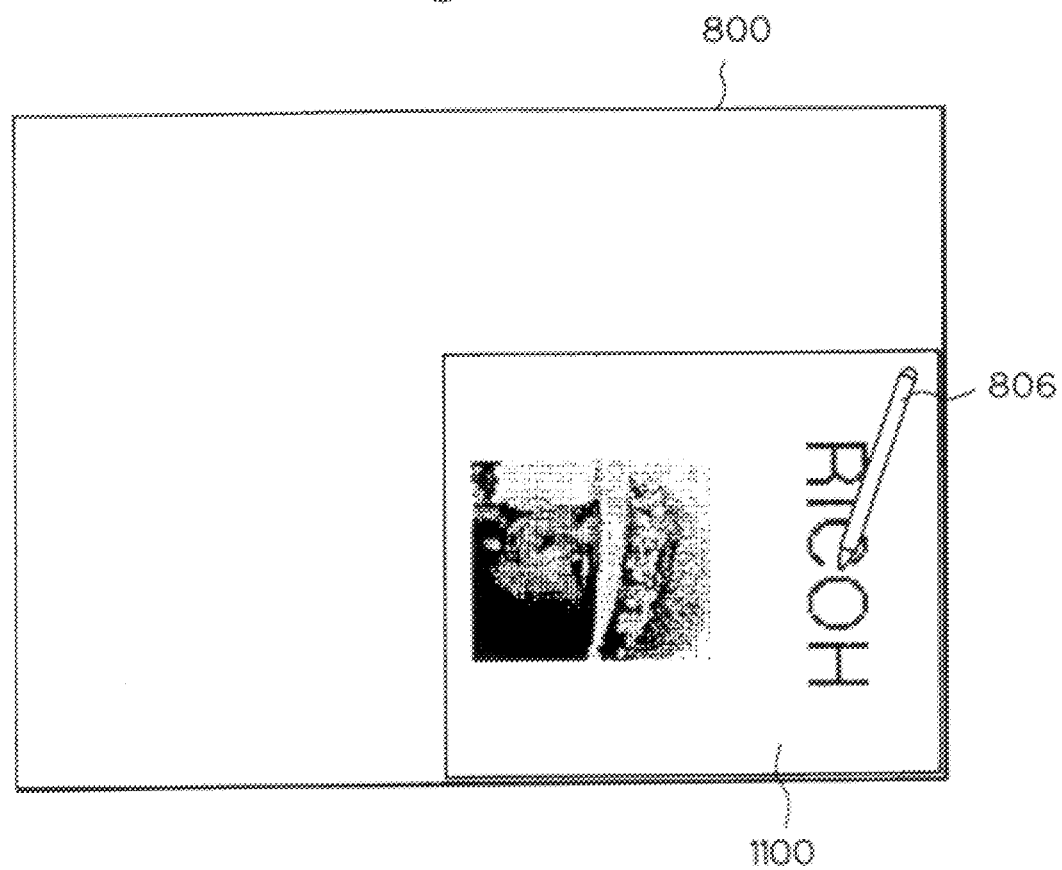
FIG. 11 demonstrates how a document is laid on the editor board of FIG. 8.

A voltage is sequentially applied to the vertical electrodes and detected in the horizontal direction, so that the pressed point of the panel 801 is detected. Specifically, as shown in FIG. 11, the user lays a document 1100 on the editor board 800 and then presses it with the tip of an exclusive pen 806. Assume that a point where the overlying electrode (2) and the underlying electrode (8) intersect, as indicated by an arrow in FIG. 12, is pressed (referred to as a point (2,8) hereinafter).Then, the electrodes (2) and (8) contact each other at the point (2,8) with the result that a current flows between them, as indicated by hatching. When the voltage is applied to the underlying or vertical electrode (8), the states of the electrodes (0)–(9) are monitored. In this case, a voltage is applied to the overlying or horizontal electrode (2), the marked point is determined to be (2,8).

The user, after having pressed the desired point on the editor board 800, presses the start key 206. Then, as shown in FIG. 13, an image of FIG. 13(a) has its portion of FIG. 13(b), extending over one-fifth of the entire lines of the image at opposite sides of the marked point (*), selected and read out of the image memory 108, FIG. 1, as the subject of image density combination. FIG. 4 shows the resulting combined density image formed on a paper.

The above embodiments allow the user to select only a predetermined number of images to be combined by the change of image processing. However, if the user can set the image density mode delicately and select any desired number of partial images to be combined, the advantages of the present invention will be more enhanced.

3rd Embodiment

Figures 14, 15A, 15B:
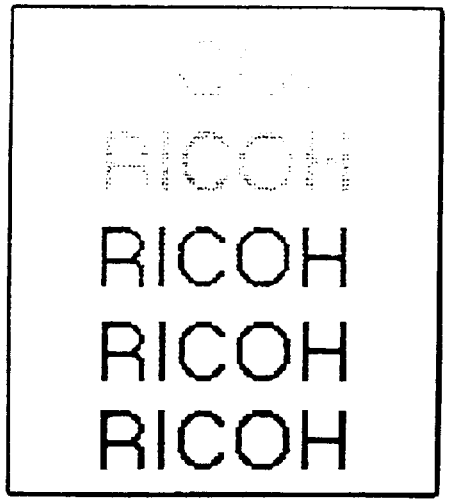
FIG. 14 shows a combined image resulting from the range shown in FIG. 13.
FIGS. 15(a) and 15(b) show specific messages to appear on a liquid crystal display in accordance with a third embodiment of the present invention.

This embodiment allows the user to select any desired number of partial images to be combined on a single paper sheet. Assume that the user has pressed the combine button 401, FIG. 6. Then, as shown in FIG. 15(a), a message for urging the user to enter the desired number of images to be combined, e.g., "Please enter the number of images. : __" appears on the LCD 402. When the user enters the desired number on the numeral keys 205, the number appears on the LCD 402 after ":", as in a message of FIG. 15(b). Because the size of the paper to output the images is limited, the size of each area to be output depends on the desired number of images. Hence, the main control 101 determines the image range to be read out of the image memory 108, as will be described with reference to FIG. 16.

Figure 16:
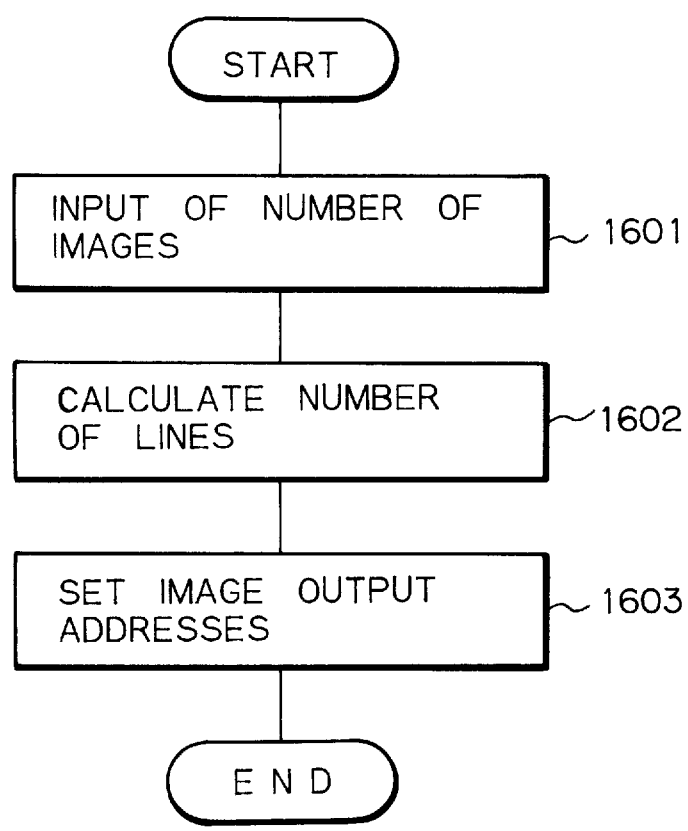
FIG. 16 is a flowchart representative of a procedure for a main control to determine the area of the image to be read out of an image memory.

In FIG. 16, when the user inputs the desired number of images to be combined (step 1601), the total number of lines of the image stored in the storage 108 is divided by the entered number to determine the number of lines of the range to be output (step 1062). The addresses of the range to be output from the storage 108 are calculated on the basis of the entered position and the entered number of images (step 1603). The determined range is repeatedly output from the storage 108 while the gamma table is sequentially replaced. As a result, a combined density image is output on a single paper sheet. Further, serial numbers are added to the partial density images output from the storage 108, as follows.

Figure 17:
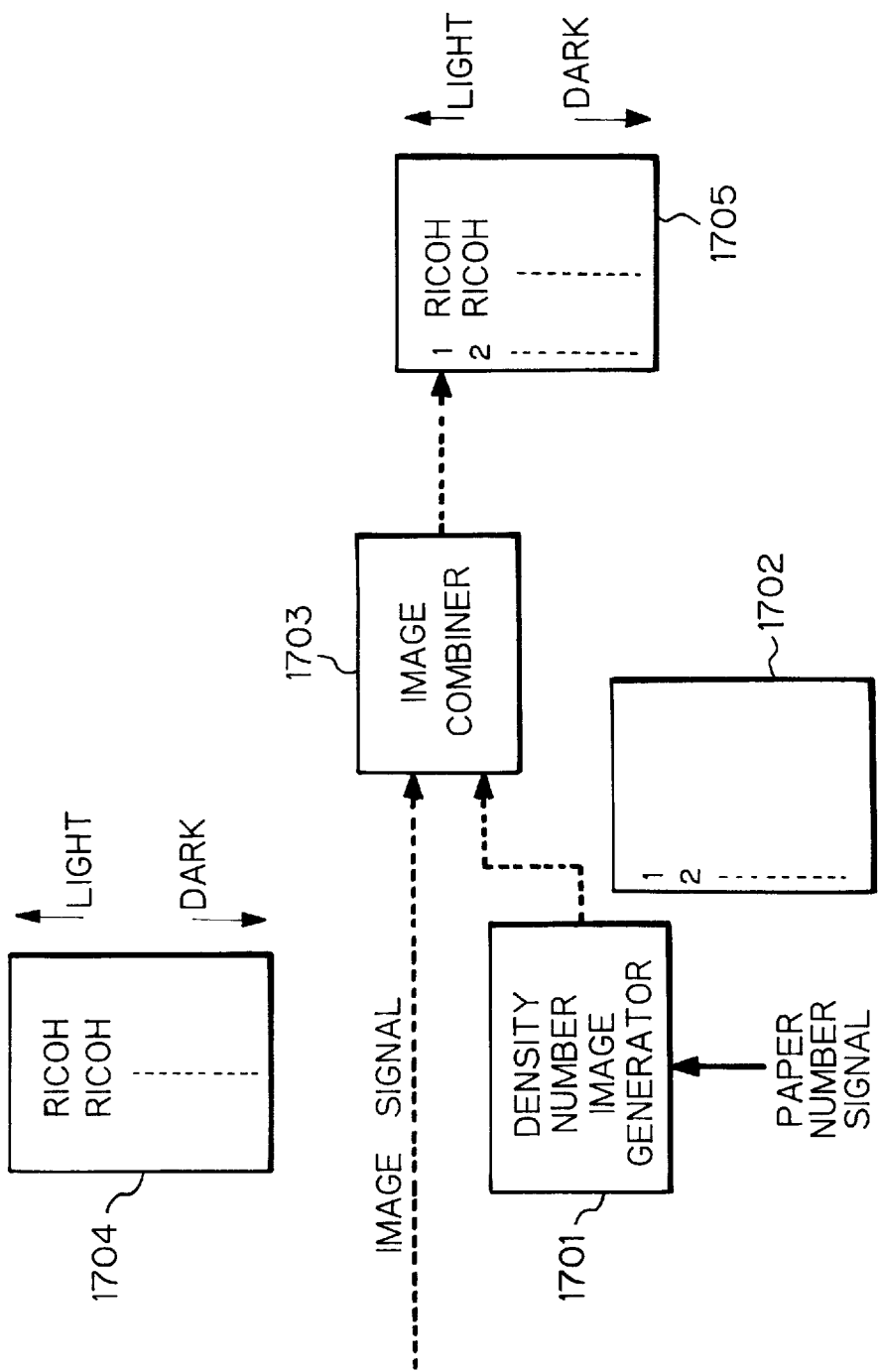
FIG. 17 is a block diagram schematically showing an arrangement for executing the procedure of FIG. 16.
Figures 18, 19A, 19B, 20A, 20B:
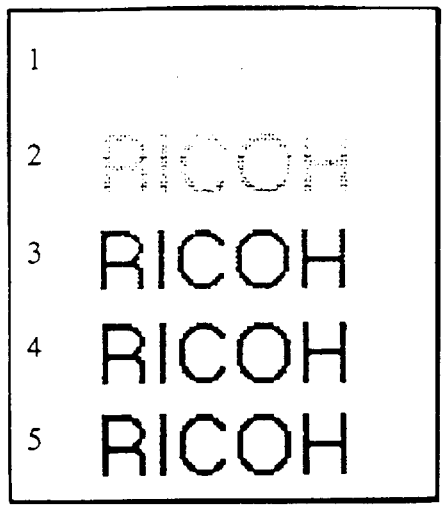
FIG. 18 shows a combined density image produced by the arrangement of FIG. 17 and including serial density numbers.
FIGS. 19(a) and 19(b) show specific messages to appear on the display of FIG. 6 after the image of FIG. 18 has been output.
FIGS. 20(a) and 20(b) show specific messages to appear on the display when the density combine button of FIG. 6 is pressed.

FIG. 17 is a block diagram schematically showing an arrangement for practicing the procedure of FIG. 16. In the figure, phantom lines and a solid line are respectively representative of image data signals and a control signal. As shown, a density number image generator 1701 is included in the image processing 105. A signal representative of the number of density images to be combined is fed from the main control 101 to the generator 1701. In response, the generator 1701 sequentially increments the number from "1" by one and thereby generates a density number image 1702 for printing number images of density level 255 at equal intervals. The image 1702 is fed to an image combiner 1703 and combined with a combined density image 1704 thereby. To prevent the numerals from becoming illegible due to the dark image portions, the image combiner 1703 produces an Exclusive-OR of each bit pixel by pixel. As a result, as shown in FIG. 18, a combined density image 1705 with the density numbers 1–5 is printed on a single paper. Thereafter, a message for urging the user to select one of the density images appears on the LCD 402, FIG. 6. For example, a message shown in FIG. 19(a), i.e., "Please choose one density image. : __" appears on the LCD 402. When the user enters the number assigned to the desired density image, the number appears after ":", as in a message (II) of FIG. 19(b). At the same time, the gamma table matching the density image number is selected and used for the image processing 105 to execute gamma conversion with the entire image stored in the storage 108. Subsequently, the processed image is output by the recording 106, so that a copy of desired density is produced.

4th Embodiment

While the above embodiment allows the user to select a desired density image by using numerals, the ease of operation will be further enhanced if the user can point at the desired density directly. Density image selecting means for implementing this kind of scheme will be described hereinafter.

In this embodiment, after the combined density image has been printed, a message shown in FIG. 20(a), i.e., "Please choose one density image." appears on the LCD 402. Then, the user lays the image or document 2100 on the editor board 800 and presses the tip of the pen 806 against the image 2100. As a result, the pressed point on the image 2100 is recognized by the procedure described with reference to FIG. 12. The main control 101, therefore, determines that the density image pressed by the pen 806 has been selected. In response, a message shown in FIG. 20(b), i.e., "Image selection is OK." appears on the LCD 402, informing the user of the end of image selection.

When the number of desired density images increases, the density evaluation will be obstructed because the size of each partial image decreases. The effect of the invention will be further enhanced if a combined density image can be output in parts on a plurality of paper sheets, as will be described.

5th Embodiment

Figures 21, 22A, 22B:
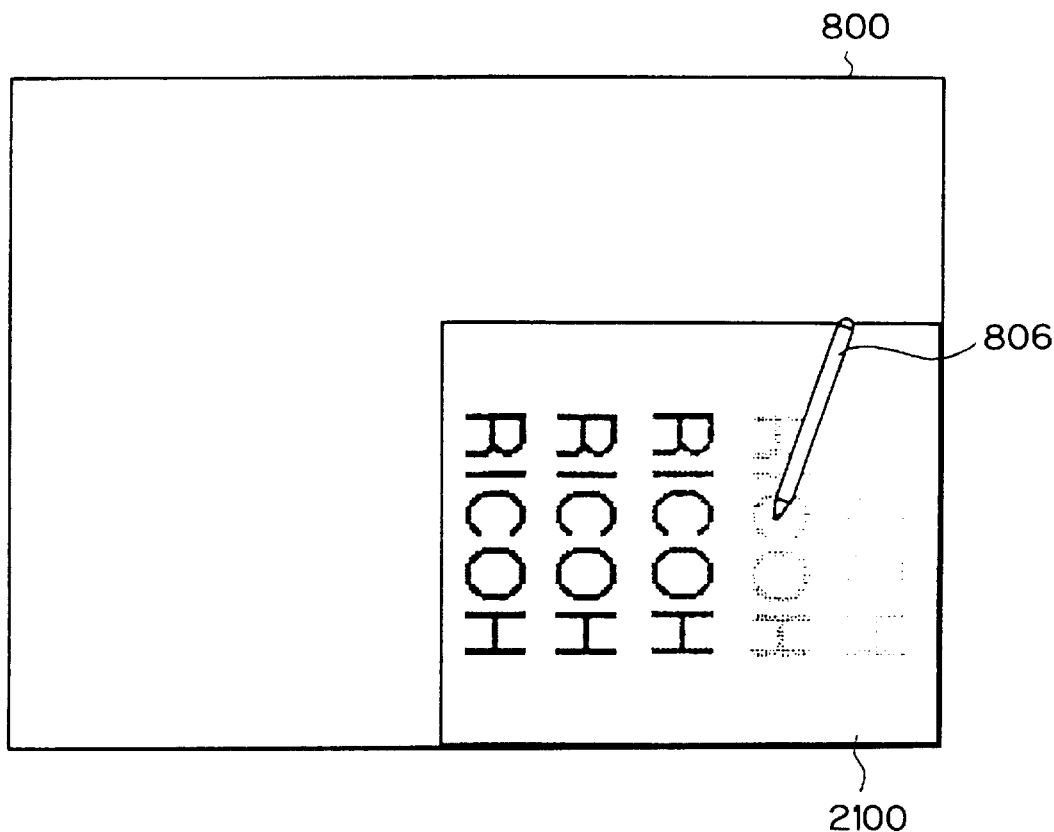
FIG. 21 shows the output image laid on the panel of the editor board in accordance with one of the the messages of FIG. 20.
FIGS. 22(a) and 22(b) show specific messages to appear on the display of FIG. 6 in association of the operation of the editor board of FIG. 21.

In this embodiment, the user first marks a desired image range to be output as a density image on the editor board 800. Specifically, when the user presses the combine button 301, a message shown in FIG. 22(a), "Please mark the top of the desired image range." appears on the LCD 402. Then, the user lays an image or document 1100 on the editor board 800 and presses the tip of the pen 806 against the upper end of the desired image range. Subsequently, a message of FIG. 22(b), i.e., "Please mark the bottom of the desired image range." appears on the LCD 402. The user, urged by the message FIG. 22(b), marks the bottom of the desired image range in the same way.

Subsequently, the message (I) of FIG. 15 appears on the LCD 402 for urging the user to enter the desired number of density images to be combined. Then, the user enters the desired number on the numeral keys 205. The main control 101 calculates the number of paper sheets to print a combined density image on the basis of the number of lines of the marked range and the desired number of density images.

Figure 23:
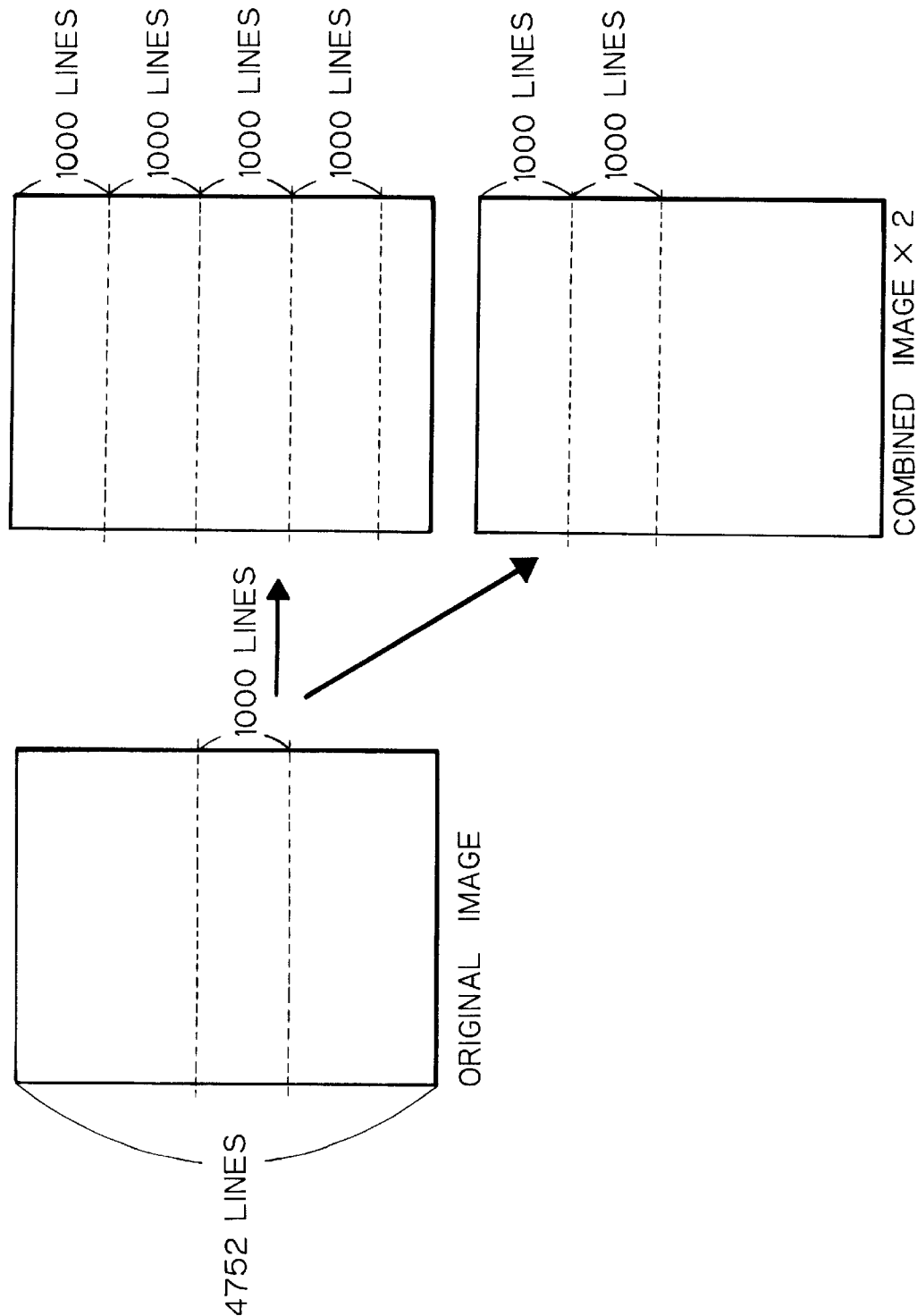
FIG. 23 shows the content of the document marked in the condition of FIG. 22, and the resulting combined density image.

For example, as shown in FIG. 23, assume that the marked range covers 1,000 lines, that a paper sheet available for the output of a combined density image accommodates 4,752 lines, and that six density images are desired. Then, 6,000 lines are necessary for the combined density image, and two paper sheets are needed. After the main control 101 has calculated the number of paper sheets, a message shown in FIG. 24 appears on the LCD 402 and informs the user of the number of paper sheets. When the user, after having confirmed the message, presses the start key 206, the desired combined density is output in parts on two paper sheets.

Figures 24, 25, 26, 27:
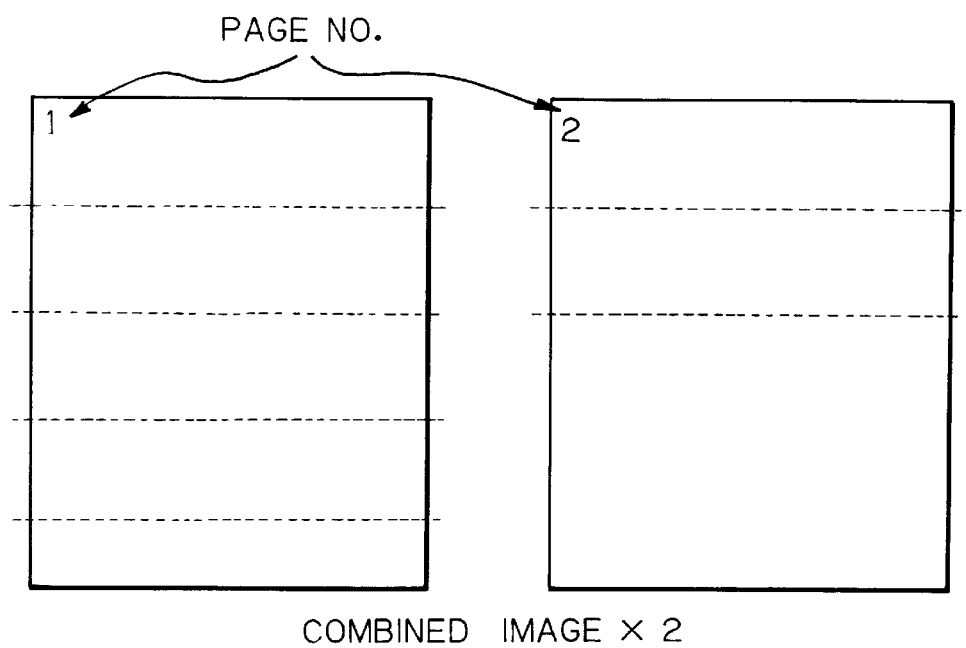
FIG. 24 shows a specific message appearing on the display and reporting the number of papers calculated on the basis of the number of lines of the marked area and the desired number of density images.
FIG. 25 shows how the image processing section adds page numbers to papers on which a single combined density image are output in parts.
FIG. 26 shows a specific message for urging the user to select one of the page numbers.
FIG. 27 shows a specific message for urging the user to select a paper size.
Figure 28:
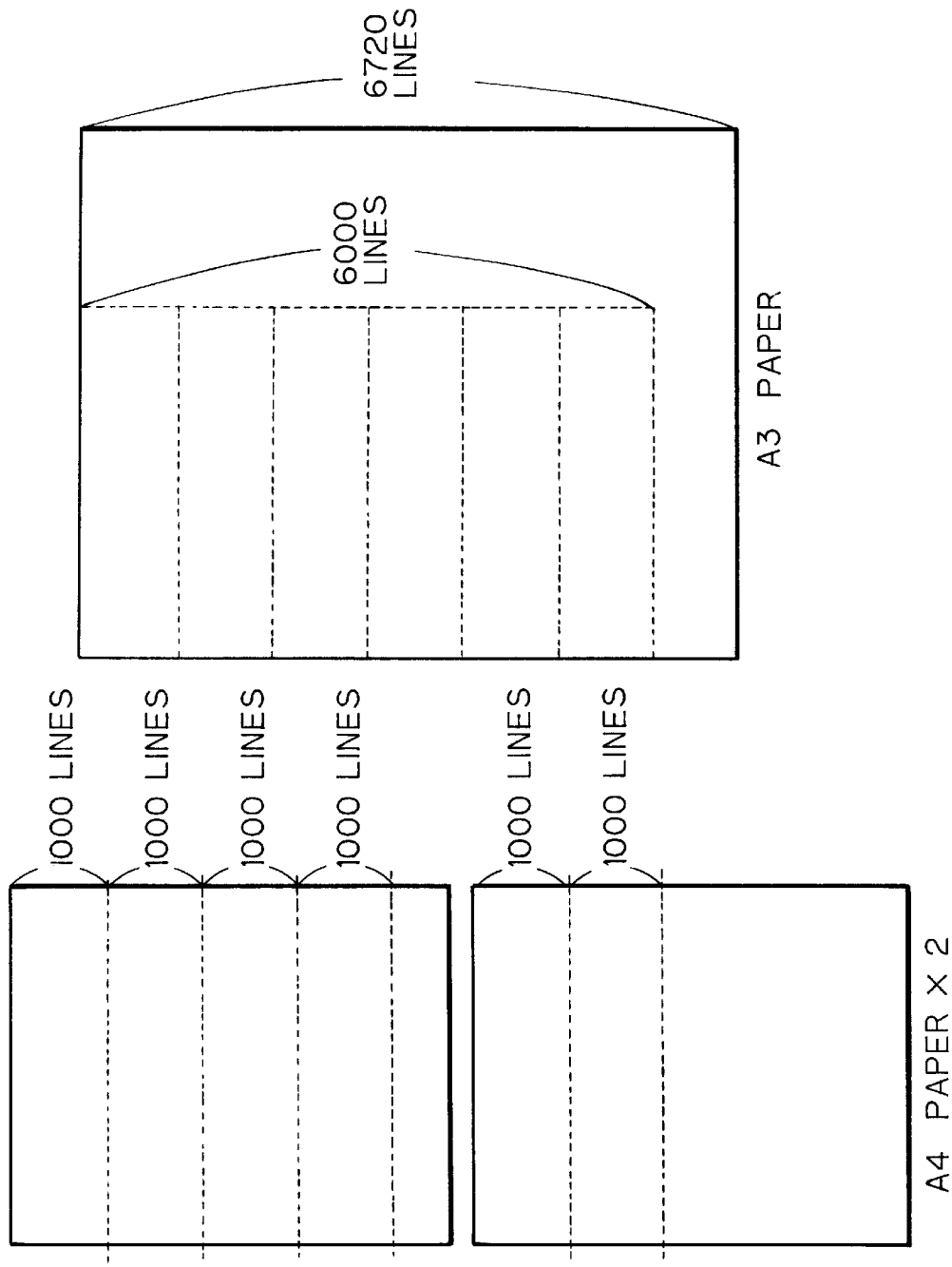
FIG. 28 shows specific processing for outputting a combined density image of optimum size via a recording section on the basis of the paper size selected.

The user can select one of the density images printed on two or more paper sheets by entering the density number assigned to the image, as stated earlier. However, when the density number is selected on the editor board 800, it is necessary to inform, before the entry on the board 800, the main control 101 of the number of paper. For this purpose, a page number may be added to each paper by image processing, as shown in FIG. 25. After the combined density image has been output, a message for urging the user to enter the page number of the paper carrying the desired density image appears on the LCD 402, as shown in FIG. 26 specifically. Then, the user enters the page number and then designates the desired density image on the editor board 800.

The convenient use of the copier will be further promoted if the user can select the size of a paper for outputting a combined density image. For example, as shown in FIG. 23, when the combined density image needs two paper sheets if the page size is A4, it can be output on a single paper sheet if the paper size is A3. In this embodiment, the user, after having marked the desired range and entered the desire number of density images, selects a desired paper size in accordance with a guidance appearing on the LCD 402, as shown in FIG. 27. The main control 101 controls the recording 106 to print the combined density image on a paper of size A3.

Figure 29:
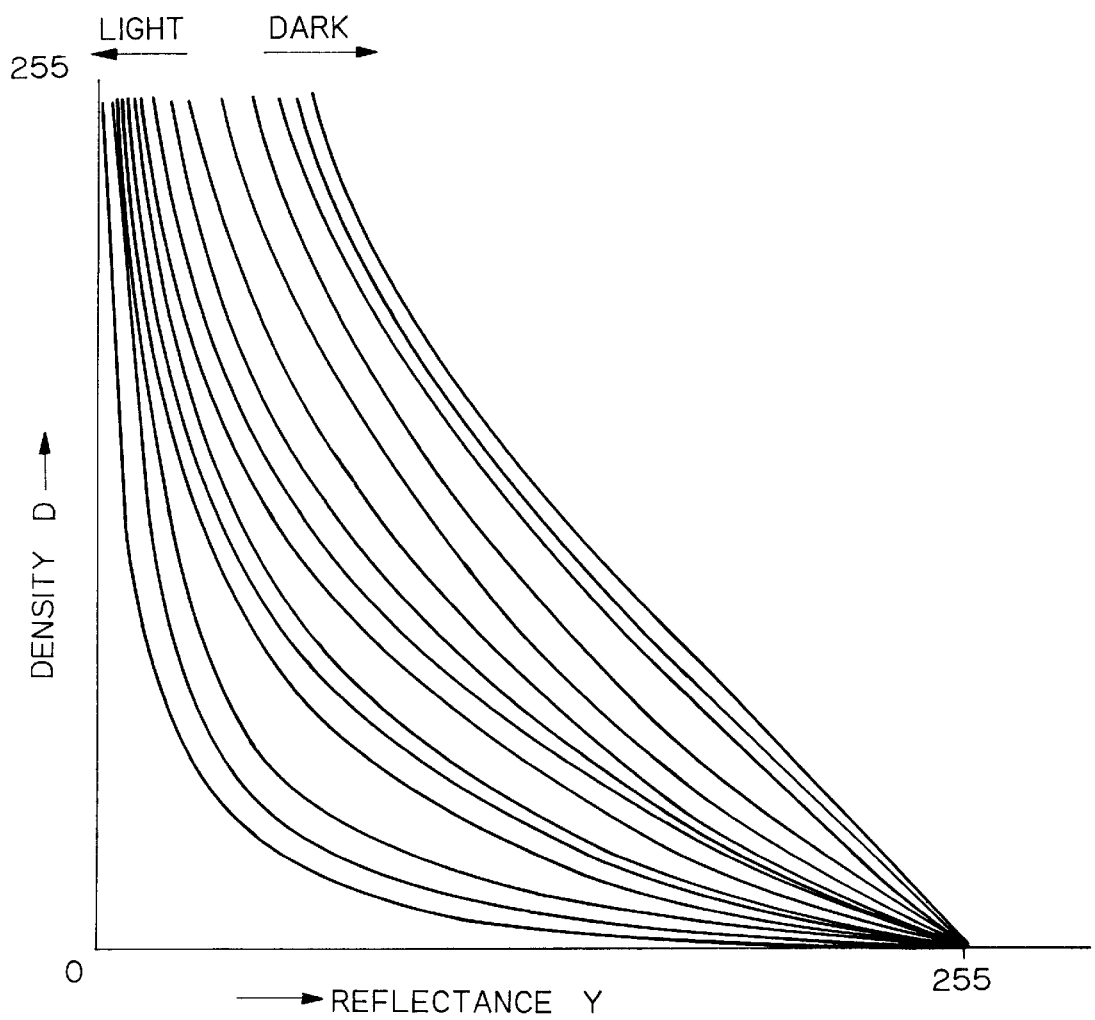
FIG. 29 shows a density-to-reflectance characteristic including a great number of characteristic values.

When the number of characteristic values is great, as represented by a density-to-reflectance characteristic of FIG. 29, a great number of gamma tables are required. In such a case, it is more preferable to form a combined density image by use of rough gamma tables, which causes the user to select a most desirable one of the resulting partial density images, and again output a combined density image by use of gamma tables around the above gamma table, than to output a combined density image at once. Then, a combined density image with more minute densities is achievable. This procedure will be described with reference to FIG. 30.

FIG. 30 shows gamma tables corresponding to the curves shown in FIG. 29. As shown, a ROM stores in its address locations indicated by numerals 1–15 with circles, a gamma providing the highest density to a gamma providing the lowest density. First, a combined density image is output by use of the gammas indicated by "*" in FIG. 30, so that density images of different densities are produced over a broad range. The user enters the number assigned to one of the resulting image densities on the editor board 800. Assume that the user has selected the density image of the gamma table 11 indicated by hatching in FIG. 30. Then, as shown in FIG. 31, a message for urging the user to determine whether or not to designate more minute densities appears on the LCD 402. If the user simply presses the start key 206, a copy is produced. However, if the user presses the combine key 301 and then the start key 206, a combined density image consisting of the partial image of the gammas 10, 11 and 12 is output. The user may select even more minute densities on such a combined density image.

In the foregoing embodiments, the combined density image is formed in order to adjust the density of images to be output by a digital copier. The present invention also allows the image quality to be adjusted by changing a pixel calculating method, e.g., smoothing or similar filtering, as follows:

6th Embodiment

Figure 32:
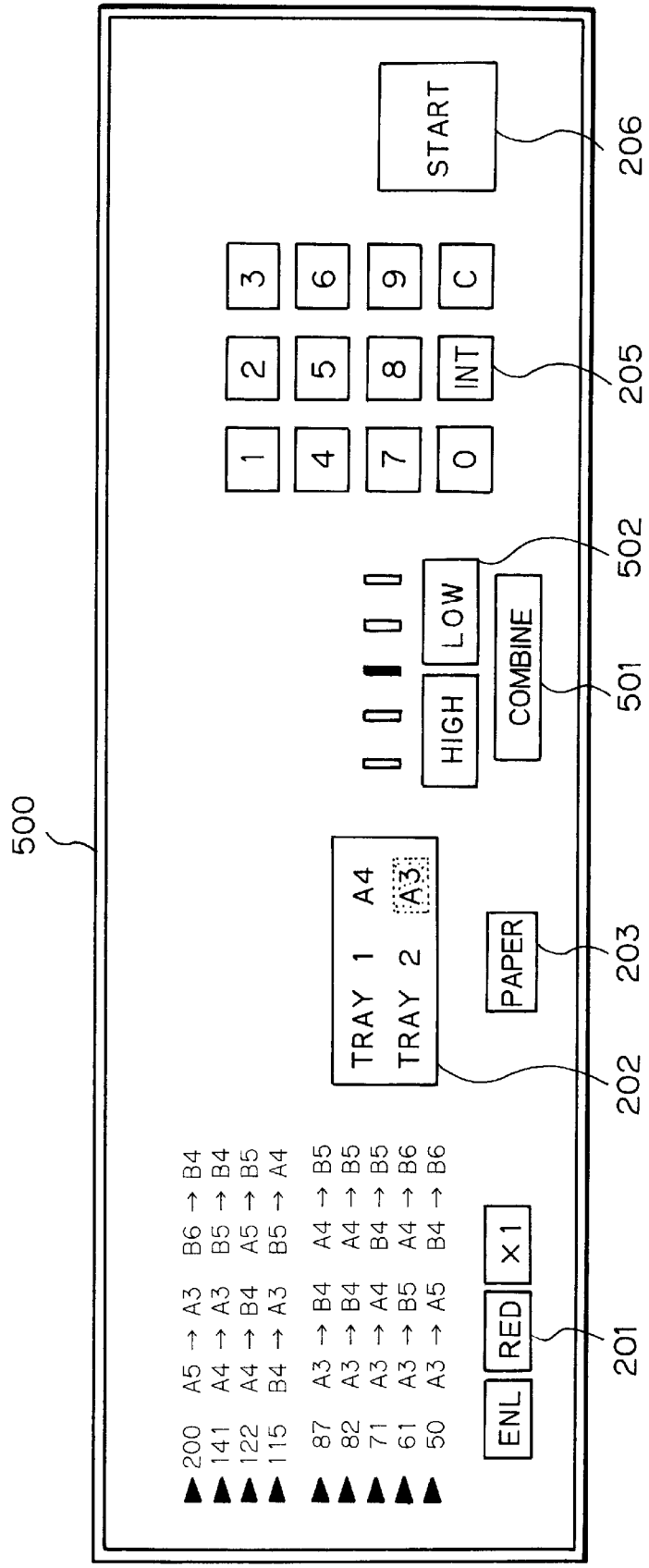
FIG. 32 is a plan view of an operation panel included in a sixth embodiment of the present invention.

In this embodiment, a plurality of images of different image quality are output on a single paper sheet by changing filter processing. Let the combined image be referred to as a combined filter image. The operation will be described with reference to FIG. 1. FIG. 32 shows an operation panel 500 included in this embodiment. As shown, the panel 500 has a filter combine key 501 in place of the density combine key 401, FIG. 6, and has smoothing intensity keys (High and Low) 502 in place of the density keys 204. The LCD 402 is absent on the panel 500.

First, the user enters various kinds of information including enlargement/reduction on the panel 500. The user presses the combine key 501 to select a combined filter image output mode, and then presses the start key 206. In response, the main control 101 causes the scanner 103 to start reading an image. The analog image signal from the scanner 103 is applied to the ADC 104 and converted to a digital signal thereby. When the combined filter image output mode is not selected, the digital signal is directly applied to the image processing 105. When the above mode is selected, the digital signal or image data are written to the storage 108. The range of the image data designated via the range marking means is read out of the storage 108 and delivered to the image processing 105.

Figures 33, 34A, 34B, 34C, 34D, 34E:
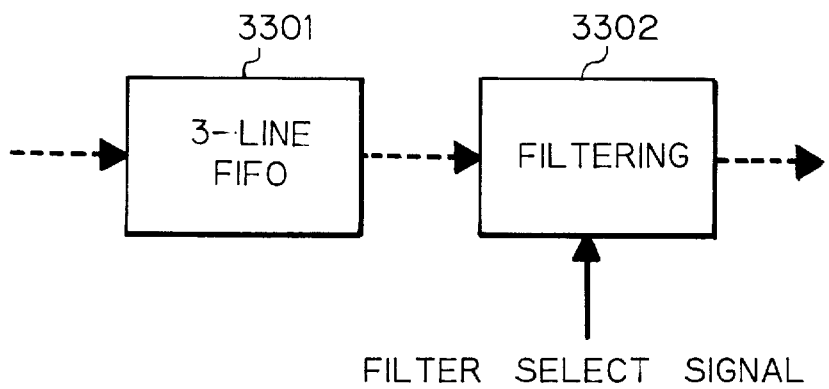
FIG. 33 is a block diagram schematically showing a processing system included in an image processing section included in the sixth embodiment.
FIGS. 34A–34E show five different filters included in a filter processing section shown in FIG. 33.

FIG. 33 shows a processing system built in the image processing 105. In the figure, phantom lines and a solid line are respectively representative of image data signals and a control signal. As shown, the system is made up of a three-line FIFO (First-In First-Out) memory 3301 and a filtering 3302. First, three lines of image data, i.e., one line of data to be processed and two lines of data preceding and following it, are written to the memory 3301 and then input to the filtering 3302, 5×3 pixels at a time. As shown in FIGS. 34A–34E, the filtering 3302 has five different 5×3 filter coefficient matrixes or filters. In each 5×3 block, the element indicated by hatching corresponds to the position of the pixel to be processed. The numerals assigned to the respective pixels are multiplied by the density values of the pixels, then the products are summed up, and then the sum is divided by the value shown at the right of the block. The resulting quotient is the filtered value. The filtering 3302 replaces, in response to a filter select signal from the main control 101, the filter or matrix every time the image range is read out of the storage 108. FIG. 35 shows a combined filter image produced by the five filter coefficient matrixes shown in FIGS. 34A–34E. In FIG. 35, zones (I)–(V) respectively correspond to the filters shown in FIGS. 34A–34E. By referencing the combined image, the user can set an adequate smoothing intensity and produce an image of desired quality.

While the embodiments have concentrated on monochromatic images and density adjustment and filtering effected therewith, the present invention is also practicable with color images and can produce a combined quality image for RGB or YMCK color adjustment or similar purpose.

In summary, it will be seen that the present invention provides a digital copier having various unprecedented advantages, as enumerated below.

(1) Image quality can be set after the condition of the actual image has been confirmed by eye. This obviates the waste of paper and promotes efficient image quality setting.

(2) It is possible for the user to select any desired range of, for example, a document with which a combined image quality image is to be output. Hence, the image quality can be set efficiently.

(3) It is possible for the user to select any desired number of partial images to be printed in the combined image quality image. This also enhances the efficient setting of the image quality.

(4) The user can select image quality as desired.

(5) A single combined image quality image can be output in parts on two or more papers. This allows a relatively broad range of the document to be selected and thereby makes it easy for the user to select desired image quality.

(6) Because the image quality of the copier can be determined by use of the image output on two or more papers, the image quality can be set efficiently.

(7) There can be selected a paper matching the desired range of the document and how many times the desired area should be output.

(8) Pixel data can be converted by use of predetermined conversion tables, further promoting the efficient image quality setting.

(9) The image quality can be set efficiently with a monochromatic image.

(10) The image quality can be set efficiently even when the pixel data are RGB, YMCK or similar color data.

Various modifications will become possible for those skilled in the art after receiving the teachings of the present disclosure without departing from the scope thereof.

What is claimed is:

1. A digital copier comprising:

image reading means for reading a document image and outputting pixel-by-pixel image data representative of said document image as an electrical signal;

storing means for storing said image data output from said image reading means;

processing means for reading a same particular portion of said image data out of said storing means repeatedly, while changing image quality of said same particular portion of said image data each time the same particular portion of said image data is read out of said storing means; and recording means for recording an output signal of said image processing means on a paper as a combined image of each same particular portion of said image data for each respective image quality.

2. A digital copier as claimed in claim 1, wherein said processing means comprises setting means for allowing a user to select a desired portion as said same particular portion.

3. A digital copier as claimed in claim 1, wherein said processing means comprises:

number setting means for setting a number of times that said same particular portion should be read; and setting means for setting said same particular portion on the basis of said number of times and a size of a paper for outputting said combined image quality image.

4. A digital copier as claimed in claim 1, wherein said processing means comprises:

quality number printing means for printing, for every image output with particular image quality, a numeral representative of said image quality together with said image; and quality setting means for setting image quality when said numeral is entered by hand.

5. A digital copier as claimed in claim 1, wherein said processing means comprises quality setting means for setting image quality when the user marks, among partial images constituting said combined image and output at the same time with respective image quality levels, a position of the image representative of one of said respective image quality levels.

6. A digital copier as claimed in claim 1, wherein said recording means divides said combined image into a plurality of parts on the basis of a size of said same particular portion and a number of times that said same particular portion should be read, and for outputting said plurality of parts on a plurality of papers.

7. A digital copier as claimed in claim 1, wherein said recording means comprises:

page number printing means for printing a particular page number for each of output images; and image quality setting means for setting image quality of an image to be output when a user designates any one of the page numbers of the output images.

8. A digital copier as claimed in claim 1, wherein said recording means comprises paper size setting means for setting a size of a paper for outputting said combined image in accordance with a command entered by a user.

9. A digital copier as claimed in claim 1, wherein said processing means forms, in the event of outputting said combined image, a rough combined image, then causes a user to select the most desirable one of partial images included in said rough combined image, and then outputs said combined image by using image quality values around said one image.

10. A digital copier as claimed in claim 1, wherein said processing means determines image quality by converting pixel data of the image on while looking up a preselected conversion table.

11. A digital copier as claimed in claim 1, wherein said processing means determines image quality by calculating pixels and thereby converting values of said pixels.

12. A digital copier as claimed in claim 1, wherein said image data comprise monochromatic data.

13. A digital copier as claimed in claim 1, wherein said image data comprise color data.

14. A digital copier as claimed in claim 1, wherein the processing means reads only the same particular portion of said image data.

15. A digital copier as claimed in claim 1, wherein the processing means include gamma tables for changing a gamma quality of said image data.

16. A digital copier comprising:
   an image reader reading a document image and outputting pixel-by-pixel image data representative of said document image as an electric signal;
   a memory storing said image data output from said image scanner;
   a processor reading a same particular portion of said image data out of said memory repeatedly, while changing image quality of said same particular portion of said image data each time the same particular portion of said image data is read out of said memory; and
   a recording unit recording an output signal of said processor on a paper as combined image of each same particular portion of said image data for each respective image quality.

17. A digital copier as claimed in claim 16, wherein said processor comprises a setting unit allowing a user to select a desired portion as said same particular portion.

18. A digital copier as claimed in claim 16, wherein said processor comprises:
   a number setting unit setting a number of times that said same particular portion should be read; and
   a setting unit setting said same particular portion on the basis of said number of times and a size of a paper for outputting said combined image quality image.

19. A digital copier as claimed in claim 16, wherein said processor comprises:
   a quality number printer printing for every image output with particular image quality, a numeral representative of said image quality together with said image; and
   a quality setting unit setting image quality when said numeral is entered by hand.

20. A digital copier as claimed in claim 16, wherein said processor comprises a quality setting unit setting image quality when the user marks, among partial images constituting said combined image and output at the same time with respective image quality levels, a position of the image representative of one of said respective image quality levels.

21. A digital copier as claimed in claim 16, wherein said recording unit divides said combined image into a plurality of parts on the basis of a size of said same particular portion and a number of times that said same particular portion should be read, and for outputting said plurality of parts on a plurality of papers.

22. A digital copier as claimed in claim 16, wherein said recording unit comprises:
   a page number printer for printing a particular page number for each of output images; and
   an image quality setting unit setting image quality of an image to be output when a user designates any one of the page numbers of the output images.

23. A digital copier as claimed in claim 16, wherein said recording unit comprises a paper size setting unit setting a size of a paper for outputting said combined image in accordance with a command entered by a user.

24. A digital copier as claimed in claim 16, wherein said processor forms, in the event of outputting said combined image, a rough combined image, then causes a user to select the most desirable one of partial images included in said rough combined image, and then outputs said combined image by using image quality values around said one image.

25. A digital copier as claimed in claim 16, wherein said processor determines image quality by converting pixel data of the image on while looking up a preselected conversion table.

26. A digital copier as claimed in claim 16, wherein said processor determines image quality by calculating pixels and thereby converting values of said pixels.

27. A digital copier as claimed in claim 16, wherein said image data comprise monochromatic data.

28. A digital copier as claimed in claim 16, wherein said image data comprise color data.

29. A digital copier as claimed in claim 16, wherein said processor reads only the same particular portion of said image data.

30. A digital copier as claimed in claim 16, wherein said processor accesses gamma tables for changing an image quality of said image data.

* * * * *